United States Patent [19]
Jones et al.

[11] 3,857,876

[45] Dec. 31, 1974

[54] POLYESTERS FROM THE REACTION OF POLYOLS AND A MIXTURE OF MERCAPTOALKANOIC AND THIOALKANOIC ACIDS

[75] Inventors: Faber B. Jones; Ralph P. Williams; Richard C. Doss, all of Bartlesville, Okla.

[73] Assignee: Phillips Petroleum Company, Bartlesville, Okla.

[22] Filed: Oct. 24, 1972

[21] Appl. No.: 299,832

Related U.S. Application Data

[63] Continuation-in-part of Ser. No. 888,910, Dec. 29, 1969, abandoned.

[52] U.S. Cl. ............ 260/481 R, 260/47 EP, 260/59, 260/78.4, 260/399
[51] Int. Cl. .......................................... C07c 149/20
[58] Field of Search ............................... 260/481 R

[56] References Cited
UNITED STATES PATENTS

| | | | |
|---|---|---|---|
| 2,815,368 | 12/1957 | Matuszak | 260/481 R |
| 2,933,473 | 4/1960 | Schmitz | 260/47 EC |
| 3,086,044 | 4/1963 | Kerschner | 260/481 R |
| 3,280,163 | 10/1966 | Louthan et al. | 260/465.1 |
| 3,280,164 | 10/1966 | Louthan | 260/465.1 |
| 3,291,776 | 12/1966 | Newey et al. | 260/47 EC |
| 3,465,057 | 9/1969 | Cameron | 260/481 R |
| 3,466,323 | 9/1969 | Tholstrup et al. | 260/481 R |
| 3,590,056 | 6/1971 | Tholstrup et al. | 260/481 R |
| R24,287 | 3/1957 | Smith | 260/481 R |

FOREIGN PATENTS OR APPLICATIONS

| | | |
|---|---|---|
| 1,024,396 | 3/1966 | Great Britain |
| 1,044,715 | 10/1966 | Great Britain |

*Primary Examiner*—Lorraine A. Weinberger
*Assistant Examiner*—John F. Terapane

[57] ABSTRACT

A polyester-polysulfide-polythiol curing agent which is the reaction product of a polyol and a mixture of a mercaptoalkanoic acid and a thiodialkanoic acid. This curing agent is employed to cure epoxy resins.

6 Claims, No Drawings

POLYESTERS FROM THE REACTION OF POLYOLS AND A MIXTURE OF MERCAPTOALKANOIC AND THIOALKANOIC ACIDS

This is a continuation-in-part application of our copending application for patent having Ser. No. 888,910, filed Dec. 29, 1969 now abandoned This invention relates to curing agents. This invention also relates to cured epoxy resins.

Curing agents such as pentaerythritol tetra(3-mercaptopropionate) are known in the art to cure epoxy resins. Not only are these curing agents expensive, but in addition they possess an offensive odor which is highly undesirable.

It now has been found that the reaction product of a polyol and a mixture of a mercaptoalkanoic acid and a thiodialkanoic acid can be employed to cure epoxy resins. Not only is the reaction mixture less odoriferous than the curing agents known in the prior art, but epoxy resins cured with the polyester-polysulfide-polythiol reaction product of this invention demonstrate an improvement in lap shear strength, as shown in the examples.

Accordingly, it is an object of this invention to provide a polyester-polysulfide-polythiol reaction product.

Another object of this invention is to provide an epoxy resin cured with the polyester-polysulfide-polythiol reaction product.

Other objects, aspects and advantages of this invention will become apparent to one skilled in the art upon consideration of the following disclosure and appended claims.

The mixture of mercaptoalkanoic acid and thiodialkanoic acid employed in this invention can have in the range of 5 to 95 weight percent mercaptoalkanoic acid, preferably in the range of 60 to 80 weight percent mercaptoalkanoic acid. The remainder of the mixture is largely thiodialkanoic acid, but a minor amount of analogous dithiodialkanoic acid can also be present, that is, as much as one mole of dithiodialkanoic acid can be present for each two moles of thiodialkanoic acid.

The mixture of mercaptoalkanoic acid and thiodialkanoic acid can be prepared by any means known in the art. For example, the mixture can be prepared by mixing a mercaptoalkanoic acid with a thiodialkanoic acid. The preferred means of preparing these mixtures is by hydrolyzing a mixture of mercaptonitriles and thiodinitriles which can be produced from alkene nitriles and hydrogen sulfide according to processes known in the art, such as the processes of U.S. Pat. No. 3,280,163 and U.S. Pat. No. 3,280,164. For example, acrylonitrile is reacted with hydrogen sulfide to form a mixture comprising largely 3-mercaptopropionitrile and thiodipropionitrile that is subsequently hydrolyzed without the necessity of separation to form a mixture comprising largely 3-mercaptopropionic acid and thiodipropionic acid which can subsequently be employed in this invention.

The mercaptoalkanoic acids which can be employed in this invention are represented by the formula $HS(CR_2)_nCOOH$ wherein R is hydrogen or alkyl having from 1 to 5 carbon atoms, the number of carbon atoms in all R groups per molecule is no more than 10, and $n$ is an integer in the range of 1 to 5.

Specific examples of mercaptoalkanoic acids that can be employed in this invention are: 3-mercaptopropionic acid, 2-mercaptoacetic acid, 6-mercaptohexanoic acid, 2,2,3,3,4,4,5,5,6,6-decamethyl-6-mercaptohexanoic acid, 4-mercaptoethyl-2-pentylnonanoic acid, 2-(2-methylpropyl)-5-mercaptopentanoic acid, 5-mercapto-7-methyloctanoic acid, and the like, and mixtures thereof.

The thiodialkanoic acids which can be employed in this invention are represented by the formula $HOOC(CR_2)_n-S-(CR_2)_n-COOH$ wherein the number of carbon atoms in all R groups per molecule is no more than 20, preferably not more than 10, and R and $n$ are as previously defined.

Specific examples of thiodialkanoic acids which can be employed in this invention are thiodipropionic acid, i.e., 3-(1-carboxyethylthio)propanoic acid, 2-(1-carboxyethylthio)propanoic acid, or 3-(2-carboxyethylthio)propanoic acid, 2-(carboxymethylthio)ethanoic acid, 6-(5-carboxy-1,2,3,4-tetramethylhexylthio)-2,3,4,5-tetramethylheptanoic acid, 6-(5-carboxy-1,1,2,2,3,3,4,4,5-nonamethylhexylthio)-2,2,3,3,4,4,5,5,6-nonamethylheptanoic acid, 4-(3-carboxypentylthio)-2-isopropylbutanoic acid, 6-(5-carboxy-3-pentyldecylthio)-2,4-dipentylhexanoic acid, 6-(5-carboxydecylthio)undecanoic acid, 5-(4-carboxy-3-methylpentylthio)-2-(2-methylpropyl)pentanoic acid, 4-(4-carboxybutylthio)pentanoic acid, and the like, and mixtures thereof.

The polyols employed according to the invention have on average more than 2, and generally at least on the average 2.5, preferably at least 3, hydroxy groups per molecule. The polyols such as at least one diol and another polyol of higher functionality can be admixed to form polyols having an average of more than 2 hydroxy groups per molecule. The products of the invention can be prepared by contacting at least one polyol, as defined herein, with a mixture of mercaptoalkanoic acid and thiodialkanoic acid under suitable reaction conditions.

The polyols which are employed in this invention are represented by the formula $Y(OH)_x$ wherein Y can be a hydrocarbon moiety having in the range of 2–40, ordinarily 3–40, carbon atoms per moiety, $x$ is an integer of at least 2 and ordinarily in the range of 3–20, and the number of carbon atoms per molecule is equal to or greater than $x$.

Specific examples of polyols that can be employed in this invention are pentaerythritol, glycerin, 2-butene-1,4-diol, 1,4-cyclohexanediol, pyrocatechol, 3,4-dimethylpyrocatechol, 1-phenyl-1,2,3-propanetriol, 1,5-naphthalenedimethanol, 2,3-dimethyl-1,4-naphthalenediol, 1,4,5,8-naphthalenetetrol, 3-hydroxymethyl-2-pentene-1,5-diol, 1,3-propanediol, 1,2-ethanediol, 1,2,3,4-butanetetrol, mannitol, 2-ethylhexane-1,3-diol, 1,20-eicosanediol, 1,40-tetracontanediol, 1,3,4,7,9,11,13,15,17,19,22,24,26,28,30,32,34,36,38,40-tetracontaneicosol, 2,2-di(p-hydroxyphenyl)propane, low-molecular weight hydroxy terminated polybutadienes, low-molecular weight hydroxy terminated polyisoprenes, 1,3,6-hexanetriol, 3,3-di(p-hydroxyphenyl)pentane, sorbitol, and the like, and mixtures thereof.

The mixtures of mercaptoalkanoic acid and thiodialkanoic acid is reacted with at least one polyol to form the polyester-polysulfide-polythiol reaction product of this invention by an esterification reaction which can be effected in any suitable equipment at temperatures preferably in the range of about 50°–250°C.

The reaction can be effected in the presence or absence of diluents which are substantially inert to the reactants and products under the reaction conditions employed. These diluents can comprise as much as 95 weight percent of the reaction mixture, if desired.

Acid esterification catalysts, such as para-toluenesulfonic acid, benzenesulfonic acid, sulfuric acid, and the like, can also be employed, if desired. In that event, the diluents employed should also be inert to these acid catalysts. Examples of diluents that can be employed include toluene, benzene, xylene, cyclohexane, and the like, and mixtures thereof.

The reaction pressure normally ranges from 0.5 to 10 atmospheres. It is normally desirable to provide a means of removing water of reaction during the course of the esterification. This function can be accomplished by means known in the art such as continuously condensing the vapors and refluxing the liquid phase and collecting water of the reaction in a water trap.

The esterification reaction should be effected to such an extent that at least 80 percent of the hydroxy groups of the polyol are reacted with carboxylic groups of the mercaptoalkanoic acid or thiodialkanoic acid to form ester groups. In general, the mole ratio of hydroxy groups of the polyol to carboxylic groups of the acids ranges from 0.8:1 to 1.2:1. Nearly stoichiometric amounts are preferred to form the ester linkages of the desired polyester-polysulfide-polythiol reaction product. In general, an average of more than 2, ordinarily an average of at least 2.5, and preferably at least 3 ester groups are formed for each molecule of polyol.

The polyester-polysulfide-polythiol reaction product of this invention can be employed to cure epoxy resins in a variety of formulations which are useful as coatings, adhesives, and the like. These curable compositions are normally prepared by contacting any epoxy resin with the polyester-polysulfide-polythiol reaction product of this invention in the presence of a suitable accelerator. Such contacting can be done by methods well known to the art for conventional curing of epoxy resins. For example, the formulation can be mixed in the presence of suitable diluents and the resulting mixtures can be sprayed on the surface which is to be coated or applied to surfaces which are to be adhered. Accelerator can be added to accelerate the curing reaction, if desired. For example, the epoxy resin and a solvent, if desired, can be sprayed from one orifice or from a multi-orifice spray gun while the other orifice can be employed to spray a mixture comprising curing agent, accelerators, solvents, diluents, and the like. Other conventional means of applying curable epoxy resin coatings or adhesives can also be employed within the scope of this invention. Preferably, sufficient quantities of epoxy resin and curing agents are employed so as to provide about one thiol group per epoxide group. However, a range of about 0.8 to 1.2 thiol groups per epoxide group can be employed. Catalytic amounts of accelerator are preferred. For example, the amount of accelerator ranges from 0.001 to 5 weight percent of the total combined weight of the epoxy resin and the prepolymer being employed.

The epoxy resins which can be cured according to this invention include any conventional epoxy resin. Normally, those epoxy resins having at least two terminal epoxy groups per molecule are preferred. For example, resins of epichlorohydrin and bisphenol A are preferred. These resins are commonly made commercially by reacting epichlorohydrin with bisphenol A in the presence of a basic catalyst such as sodium hydroxide. The second group of epoxy resins which can be employed in this invention are the epoxy novolac resins. These are basically phenol formaldehyde novolac resins whose phenolic hydroxide groups have been converted to glycidyl ethers. Commonly, the average number of epoxy groups per molecule of such compounds is greater than 2. Generally, these compounds have epoxy functionality in the range of 3 to 8 epoxy groups per molecule. A third type of epoxy resins are the epoxy esters. Particularly preferred is diglycidyl isophthalate which is derived from isophthalyl chloride and glycidol.

Amine accelerators can also be employed, if desired. Generally, all amines or mixtures of amines known in the art to be useful as accelerators for the curing of epoxy resins with polythiols can be employed. Tertiary amines are preferred. However, any amine that is an in situ precursor to a tertiary amine can also be employed. Examples include 2,4,6-tris(dimethylaminomethyl)-phenol, diethylenetriamine, phenylenediamine, tri-n-hexylamine, benzyldimethylamine, morpholine, triethylenetetraamine, and the like.

Suitable diluents that can be employed in this invention include any material that does not deleteriously affect the curing or other properties of the epoxy resin coatings or adhesives. Specific examples are methyl ethyl ketone, diethyl ether, tetrahydropyran, acetone, benzene, toluene, xylene, hexane, dioxane, tetrahydrofuran, and the like.

The uncured coatings or adhesive compositions of this invention, after application, can be cured in any conventional manner. Curing temperatures range from 0°C to 100°C. Normally, elevated temperatures are not required to cure the epoxy resin compositions. Temperatures of 15°–20°C are generally satisfactory.

Formulated compositions of this invention can be coated or adhered to plastics, metals, wood, ceramics, and the like. One preferred application is as a coating for polyolefins to prevent permeation by hydrocarbons. Gasoline tanks fabricated of polyolefins such as Marlex (trademark for polyolefin) and coated with a polyester-polysulfide-polythiol reaction product cured epoxy resin of this invention are impervious to permeation by hydrocarbons.

The advantages of this invention are further illustrated by the following examples. The reactants and proportions and other specific conditions are presented as being typical and should not be construed to limit the invention unduly.

EXAMPLE I

A stirred reactor was charged with 424.0 g of acrylonitrile, 545.0 g of hydrogen sulfide, 4 ml of methylethylpyridine, and 8.0 g of sulfur. The reaction mixture was agitated for five hours, with the reaction temperature being maintained between 25° and 65°C. Upon degassing, a product weighing 679 g was recovered. A 100 g fraction of the product was distilled at 0.5 mm Hg to yield 71 g of mercaptopropionitrile product. This constituted a yield of 68.2 mole percent based on the acrylonitrile charged. The composition prepared was determined to be comprised of 71 weight percent 3-mercaptopropionitrile and 27 weight percent of dicyanoethyl sulfide and disulfide (largely dicyanoethyl sulfide).

The 579 g portion of the above product was hydrolyzed to the corresponding carboxylic acids as follows: 579 g of the product, 11.6 g of p-toluenesulfonic acid, and 873 ml of concentrated hydrochloric acid were charged to a reactor at 25°C and then maintained at a temperature of 95° to 100°C for 5 hours. A product was recovered which contained 3-mercaptorpropionic acid and mostly thiodipropionic acid in a mole ratio of 81:19. The product, which weighed 1555 g, was found to contain 32.2 weight percent of 3-mercaptopropionic acid, 12.8 weight percent of substantially thiodipropionic acid, 23.9 weight percent of ammonium chloride, and 25.7 weight percent of water, hydrogen chloride, etc.

A 225 g portion of the reaction product and 37.5 g of pentaerythritol were charged to a reactor and heated to 100°C for 5 hours. During this time 83 milliliters of water was removed. Toluene was added, and additional water was removed. Chloroform was added and the mixture was washed with a 5 percent aqueous solution of sodium bicarbonate with an added 25 g of ammonium chloride to break the resulting emulsion. The organic layer was dried over magnesium sulfate and concentrated under vacuum to yield 99.0 g of polyester-polysulfide-polythiol prepolymer.

A series of three more runs were made in a similar manner and a composite was made of the polyester-polysulfide-polythiol reaction products thus prepared. The composite had a molecular weight of 860, an acid number of 5.7, an equivalent weight of 202.5 based on the percent of —SH groups present, and a —SH group concentration of 15.8 percent.

This example demonstrates the preparation of the polyester-polysulfide-polythiol reaction products of this invention.

EXAMPLE II

A commercial epoxy resin, Epon 828 (a trademark for the reaction product of epichlorohydrin and bisphenol A) having a molecular weight of about 390 and an epoxide equivalent per 100 g of 0.53 was obtained from the Shell Chemical Company. A total of 5.70 g of this epoxy resin was blended with 6.06 g of the polyester-polysulfide-polythiol reaction product of Example I and 0.125 g of an accelerator [2,4,6-tris(dimethylaminomethyl)phenol].

The above adhesive mixture was tested for adhesive lap shear strength in accordance with ASTM test procedure D 1002-53T. Briefly, the method can be described thus: Two precleaned aluminum strips (1.000 in. X 4.000 in. X 0.064 in.) are placed in a holder designed so that ½-inch of each strip overlaps the other. The space between the strips is filled with the adhesive mixture to be tested (generally 5–10 mils thick) and cured (usually 24 hours at 25°C and 4 hours at 150°C). The force necessary to break the resulting bond in a tensile shear fashion is then determined using an Instron Model TT testing machine equipped with a special chamber for controlling the temperature of the bond. Tensile shear strengths are calculated in pounds per square inch (psi) of bonded area.

The adhesive mixture was found to have an adhesive lap shear strength of 3,740 psi at −17°C and 4,183 psi at 25°C.

EXAMPLE III

A commercial pentaerythritol tetra-3-mercaptopropionate product was obtained from the Carlisle Chemical Company. A total of 13.2 g of this curing agent was blended with 19.0 g of Epon 828 epoxy resin and a small amount of accelerator as in Example II.

This adhesive mixture was tested as a control for lap shear strength in accordance with ASTM 1002-53T, as was done in Example II.

This prior art adhesive was found to have a lap shear strength of 2,877 psi at −17°C and 3,507 psi at 25°C.

The control run of this example and the run of Example II demonstrate that epoxy resins cured with the polyester-polysulfide-polythiol reaction product of this invention have improved the lap shear strengths at ordinary environmental temperatures.

Although this invention has been described in considerable detail, it must be understood that such detail is for the purpose of illustration only and that many variations and modifications can be made by one skilled in the art without departing from the scope and spirit thereof.

We claim:

1. The polyester-polylsulfide-polythiol reaction product formed by contacting
   I. a hydrocarbon polyol represented by the formula $Y(OH)_x$ wherein Y is a hydrocarbon moiety having from 2 to 40 carbon atoms per moiety, $x$ is an integer in the range of 2 to 20, and the number of carbon atoms per molecule is equal to or greater than $x$, and mixtures thereof, with the further provison that the number of hydroxy groups and number of carbon atoms per molecule be on average more than 2, and an acid mixture consisting of
   II. 5 to 95 weight percent of a mercaptoalkanoic acid represented by the formula $HS(CR_2)_n COOH$ wherein R is hydrogen or an alkyl having from 1 to 5 carbon atoms, the number of carbon atoms in all R groups per molecule is no more than 10, and $n$ is an integer in the range of 1 to 5, and
   III. 95 to 5 weight percent of a thiodialkanoic acid represented by the formula $HOOC(CR_2)_n-S-(CR_2)_n-COOH$ wherein the number of carbon atoms in all R groups per molecule is no more than 20, and R and n are as previously defined, or a mixture of said thiodialkanoic acid and the analogous dithiodialkanoic acid such that up to one mole of dithiodialkanoic acid is present for each two moles of thiodialkanoic acid,
   said contacting being effected at a temperature in the range of about 50°–250°C and under esterification conditions such that at least 80 percent of the hydroxy groups of said (I) polyol are reacted with carboxylic groups of said acid mixture of (II) and (III) acids to form ester groups, the amounts of (I) polyol, (II) and (III) acids present during said contacting being sufficient to provide a ratio of hydroxy groups of said (I) polyol to carboxylic groups of said (II) and (III) acids in the range of 0.8:1 to 1.2:1.

2. A composition formed according to claim 1 wherein (I) is a polyol represented by the formula $Y(OH)_x$ wherein Y is a hydrocarbon moiety having from 3 to 40 carbon atoms per moiety, $x$ is an integer in the range of 3 to 20, and the number of carbon atoms per molecule is equal to or greater than $x$, and (III) is a thiodialkanoic acid or a mixture of thiodialkanoic and dithiodialkanoic acids wherein the number of carbon atoms in all R groups per molecule is no more than 10.

3. A composition formed according to claim 1 wherein said (I) polyol is pentaerythritol, and said (II) and (III) is a mixture of acids produced by the hydrolysis of the product resulting from the reaction of acrylonitrile and $H_2S$, employed in a molar ratio of about 1:2, respectively, in the presence of sulfur and methylethylpyridine at a reaction temperature between 25° and 65°C.

4. A composition formed according to claim 1 wherein the amounts of polyol, mercaptoalkanoic and thiodialkanoic acids present during said contacting are sufficient to provide a substantially stoichiometric ratio of hydroxy groups of said (I) polyol to carboxylic groups of said (II) and (III) acids.

5. A composition formed according to claim 1 wherein said mixture consists of 5 to 95 weight percent of said mercaptoalkanoic acid and correspondingly 95 to 5 weight percent mixed thiodialkanoic and dithiodialkanoic acids such that up to 1 mole dithiodialkanoic acid is present for each 2 moles thiodialkanoic acid.

6. A composition formed according to claim 1 wherein said mixture consists of 60 to 80 weight percent of said mercaptoalkanoic acid and correspondingly 40 to 20 weight percent mixed thiodialkanoic and dithiodialkanoic acids such that up to 1 mole dithiodialkanoic acid is present for each 2 moles thiodialkanoic acid.

* * * * *